Patented Dec. 28, 1948

2,457,661

UNITED STATES PATENT OFFICE 2,457,661

POLYMERIZING VINYL ALKYL ETHERS

Frederick Grosser, Easton, Pa., assignor to General Aniline & Film Corporation, New York, N. Y., a corporation of Delaware No Drawing. Application December 22, 1945, Serial No. 637,034

6 Claims. (Cl. 260—90)

This invention relates to improvements in the polymerization of vinyl ethers, more particularly to a new catalyst therefor.

The promotion of the polymerization of vinyl ethers by means of acid catalysts is known. The reaction is usually carried out by adding the catalyst in small amounts from dilute solution in a suitable organic solvent to the vinyl ether in the presence of an organic diluent which does not adversely affect the reaction and which is liquid at the reaction temperatures. The diluent functions to give a smoother reaction and to promote removal of the heat developed therein. Cooling may also be applied to control the temperature of the reaction.

It is an object of the present invention to provide a new catalyst for the polymerization of vinyl ethers.

A further object is the provision of a process for the polymerization of vinyl ethers.

Other objects will appear from the description.

I have found gallium trichloride to be an excellent catalyst for the polymerization of vinyl ethers. In its action as a promoter of the polymerization of vinyl ethers, gallium trichloride has been found to be superior to any of the catalysts previously used therefor.

It may be applied in the polymerization of vinyl ethers following the usual practice for the application of acid catalysts of the type of the boron fluoride-diethyl ether complex.

It is an advantage of the present invention that gallium trichloride is not only an efficient catalyst for the polymerization of vinyl ethers, but requires no moderation of its activity by combination with other substances in the form of addition compounds.

According to the process of the present invention, vinyly ethers, singly or in admixture, may be polymerized by contacting them with small amounts of gallium trichloride in the presence of an organic diluent which does not adversely affect the polymerization, hereinafter referred to as inert, and which is liquid at the polymerization temperatures. By the term inert, it is not intended to exclude from the process of the invention organic diluents which in addition to their non-adverse character exert a beneficial effect in the polymerization. The process may be applied at reaction temperatures ranging from low sub-zero temperatures, e. g., —80° C. to 0° C. and above for the production of polymers varying in consistency from products which are viscous liquids to semisolids to solid, rubberlike or waxlike bodies. Cooling may be applied to the reaction for controlling the temperature thereof.

The polymerization of vinyl ethers in accordance with the present process may be carried out by adding the vinyl ethers to the exactly calculated quantity of gallium trichloride for the polymerization contained in the diluent. Preferably, however, the catalyst is added to the vinyl ether contained in the diluent. In accordance with the preferred method, the gallium trichloride dissolved in an inert organic solvent therefor, and here also the term inert has the connotation given above, for example, petroleum ether, benzene, carbon tetrachloride, carbon disulfide, etc., is added dropwise to the mixture of the vinyl ether and diluent. To facilitate the accurate addition of the catalyst and to promote smoothness in the reaction through avoidance of local overconcentration of the catalyst and attendant local overheating, the catalyst is employed in extremely small concentrations, for example, in about .01% to about 1% solutions. The amounts of gallium trichloride necessary for the polymerization need be quite small and frequently will amount to only about .00015% to .005% on the weight of the vinyl ether monomer or mixtures of the monomers. The solution of the catalyst is added to the mixture of the monomer and diluent until the polymerization is completed, which result may be determined by adding a few drops of the catalyst solution to a sample of the reaction mixture, the absence of heating or charring therein denoting completion of the polymerization.

After the polymerization has been completed, the catalyst in the polymer is inactivated by mixing the polymer, preferably in the reaction vessel, with a solution of an alkaline-reacting agent, commonly referred to as a quenching agent. A suitable quenching agent is, for example, concentrated ammonium hydroxide which is added in amount sufficient to neutralize the gallium trichloride present. Along with the quenching agent, a stabilizing agent for retarding the depolymerization of the polymer by heat is preferably added, and for this purpose there may be used from about 0.5% to about 2% on the weight of the polymer of, for example, beta-naphthylamine, phenyl-beta-naphthylamine, ethyl-alpha-naphthylamine, N-N'-di-beta-naphthyl-p-phenylenediamine (Agerite White, U. S. P. 1,940,815), p-hydroxy-n-phenyl morpholine (Solux, U. S. P. 2,156,380), thiourea, etc.

The diluent for the reaction may be a solvent or a nonsolvent for the eventual polymer. They may be selected from among, for example, the liquid and liquefied hydrocarbons and chlorinated hydrocarbons. With some exceptions, almost all of the common organic solvents are solvents for the polymers at 0° C. or higher. Methyl alcohol, nitromethane, and a few high boiling solvents such as polyhydric alcohols are not solvents and are not suitable as diluents since they have a deleterious effect on the reaction. Suitable diluents which are solvents for the polymers are, for example, n-pentane, benzene, toluene, methylene chloride, chloroform and chlorobenzene, the latter two being preferred solvent diluents. Propane, butane are examples of suitable non-solvent diluents for the reaction, propane being a preferred non-solvent diluent. The proportion of the diluent to the monomer in the reaction mixture may vary. Preferably, only sufficient of the diluent is employed as will form a stirrable mixture with the eventual polymer, which in most cases will amount to about 2 to 4 of the diluent to 1 part of the vinyl ether monomer, optimally about 3 parts to 1 part.

Among the vinyl ethers which may be polymerized in accordance with the process of my invention are, for example, the vinyl alkyl, alkyl vinyl alkyl, vinyl cycloalkyl, vinyl aralkyl or vinyl aryl ethers, such as vinyl methyl, vinyl ethyl, vinyl isopropyl, vinyl n-butyl, vinyl isobutyl, vinyl hexyl, vinyl octyl, vinyl decyl, vinyl dodecyl, vinyl tetradecyl, vinyl octadecyl, ethyl-n-propenyl, ethyl isopropenyl, vinyl cyclohexyl, vinyl o-cresyl, vinyl m-cresyl, vinyl phenyl, vinyl alpha- or beta-naphthyl ethers, etc. Further examples are: divinyl ether and the mono and divinyl ethers of the glycols and polyalkylene glycols and of the monoalkyl and aryl ethers of the glycols and polyalkylene glycols, for example, of di-, tri- or tetra-ethylene or -propylene glycols and of higher glycols, such as of octadecanediol, etc. Specific compounds of the glycol ethers are, for example, the vinyl ethers of mono-, di- or tri-ethylene or -propylene glycol, -monomethyl, -monoethyl, -monobutyl, -monophenyl or -monocresyl ether.

The invention and the application of my process to the polymerization of vinyl ethers is further illustrated by the following specific examples to which it is not intended that the invention be limited. Parts are by weight.

*Example 1*

5 parts of vinyl isopropyl ether and 21 parts of chloroform were agitated at 0° C. in a reaction vessel under a reflux condenser. To the resulting chloroform solution of the vinyl ether was added dropwise over a period of 55 minutes, $5.2 \times 10^{-2}$ parts of a 1% solution of gallium trichloride in petroleum ether ($16 \times 10^{-5}$ parts $GaCl_3$). The temperature of the reaction mixture reached a maximum of 25° C. in about 3 minutes and then gradually fell. After an hour the catalyst was quenched by mixing the reaction mixture with an amount of concentrated ammonium hydroxide sufficient to neutralize the gallium trichloride present. 1% of N-N'-di-beta-naphthyl-p-phenylenediamine was then added and mixed with the polymer to stabilize it. On evaporating off the solvent by warming under a vacuum at 50° C., a quantitative yield of a tough form-stable polymer of specific viscosity 2.94 was obtained.

*Example 2*

5 parts of vinyl n-butyl ether and 6 parts of chloroform were mixed at 0° C. in a reaction vessel under a reflux condenser. 0.66 part of a .025% solution of gallium trichloride in petroleum ether ($17 \times 10^{-5}$ parts $GaCl_3$) was added dropwise to the diluent solution of the monomer over a period of 100 minutes. The temperature reached a maximum of 26° C. in about 25 minutes after the last addition of the catalyst and then gradually fell. After 85 minutes the catalyst in the polymer was quenched with concentrated ammonium hydroxide and the polymer stabilized with 1% of Agerite White in the manner of the previous example. Removal of the solvent at 50° C. under a vacuum gave a form-stable polymer of specific viscosity 1.48.

The specific viscosities noted herein are calculated from the viscosity of the polymers determined at 25° C. in an Ostwald-Fenske capillary viscometer on a 1 gram solution of the polymer in 100 ml. of benzene.

The polymers obtained in the present process, if desired, may be washed with water, to which preferably a small amount of ammonium hydroxide has been added, to remove inorganic residues resulting from the neutralization of the catalyst with the quenching agent.

The vinyl ethers in the foregoing specific examples, which were prepared by the reaction of the corresponding aliphatic alcohol with acetylene, were purified by washing with water to remove residual alcohol and any aldehyde present as such are inimical to the functioning of acid type catalysts. They were further purified from such by standing over metallic sodium for about 24 hours, following which they were subjected to one precise fractional distillation. This purification of the vinyl ethers is not essential to their polymerization but will give polymers of higher molecular weight under the same conditions of polymerization.

Depending on whether a solvent or a non-solvent is used as the diluent the temperature of the polymerization will have a marked effect on the character of the polymer obtained. Using a non-solvent as the diluent in the process, the viscosity of the polymer generally increases as the temperature of the polymerization is lower, thus at −80° C. solid rubbery polymers may be obtained whereas at 0° C. the polymers are softer in body. Using a solvent as the diluent in the process and conducting the polymerization at a temperature below 0° C., there is little effect exerted by the temperature on the character of the polymer produced. Some increase in the viscosity of the polymer is to be observed as the temperature of the polymerization is lowered from room temperature down to 0° C., but further reduction in the polymerization temperature down to −80° C. will produce no appreciable further increase in the vicosity of the eventual polymer.

A preferred range of temperatures for the polymerization using a solvent for the polymer as the diluent is from about −10° C. to about 50° C., more particularly from about 0° C. to about 25° C. Within these preferred ranges of temperatures for the polymerization and using a solvent for the diluent, I have found that polymeric vinyl ethers of higher viscosity can be obtained at a given temperature of polymerization than when using the boron fluoride-diethyl ether addition compound as catalyst, the conditions of the polymerization otherwise being comparable. This superiority of gallium trichloride over boron fluoride-diethyl ether is clearly shown by the results in the following table. The results were obtained from comparable polymerizations conducted in accordance with the procedure of the process defined herein. The polymerizations were initiated at 0° C. in each instance, using a diluent which is a solvent for the polymer. The boron fluoride-diethyl ether addition compound was applied in the polymerizations from solution in diethyl ether and the gallium trichloride from solution in petroleum ether. The boron fluoride-diethyl ether addition compound is identified in the table as $BF_3$ complex.

| Vinyl Ether | Diluent | Diluent Monomer Ratio | Specific Viscosity | Catalyst |
|---|---|---|---|---|
| Isopropyl | n-pentane | 1:1 | 0.33 | 1% $BF_3$ complex. |
| Do | do | 3:1 | 2.89 | 0.1% $GaCl_3$. |
| Do | Chloroform | 3:1 | 1.42 | 1% $BF_3$ complex. |
| Do | do | 3:1 | 5.38 | .05% $GaCl_3$. |
| n-butyl | do | 1:1 | 0.66 | 1% $BF_3$ complex. |
| Do | do | 1:1 | 1.84 | .05% $GaCl_3$. |

Gallium trichloride has the further advantage over boron fluoride-diethyl ether complex as a catalyst for the polymerization in that it is soluble in a wider range of organic solvents. In order to achieve a homogeneous controllable reaction, the catalyst is added to the monomer from solvent solutions of low concentration. In the selection of the solvent, care must be exercised to avoid those which would act adversely to the polymerization. Thus, gallium trichloride by its capacity of being soluble in a wider range of organic solvents, affords a greater margin of freedom than does boron fluoride-diethyl ether complex in the selection of a solvent for making up the catalyst solution.

As various other embodiments of the invention will occur to those skilled in the art, it is not intended that the scope of the patent be limited except as is required by the prior art and the appended claims.

I claim:
1. A process for polymerizing a vinyl ether of the general formula:

$$CH_2=CH-O-R$$

wherein R represents a hydrocarbon radical  which comprises subjecting the vinyl ether in the presence of an inert organic diluent which is liquid at the temperature of the polymerization to the action of an amount of gallium trichloride sufficient to promote the polymerization.

2. A process for polymerizing a vinyl alkyl ether which comprises subjecting it in the presence of an inert organic diluent which is liquid at the temperature of the polymerization to the action of an amount of gallium trichloride sufficient to promote the polymerization.

3. The process as defined in claim 2, wherein the inert organic diluent is a solvent for the polymerized vinyl alkyl ether and the polymerization is conducted at a temperature between about −10 and 50° C.

4. The process as defined in claim 3, wherein the vinyl alkyl ether is vinyl isopropyl ether.

5. The process as defined in claim 3, wherein the vinyl alkyl ether in vinyl n-butyl ether.

6. The process as defined in claim 2, wherein the inert organic diluent is a solvent for the polymerized vinyl alkyl ether and the polymerization is conducted at a temperature between about 0 and 25° C.

FREDERICK GROSSER.

REFERENCES CITED

The following references are of record in the file of this patent:

UNITED STATES PATENTS

| Number | Name | Date |
|---|---|---|
| 2,104,000 | Reppe et al. | Dec. 28, 1937 |

OTHER REFERENCES

Ulich and Heyne, Zeit, Electrochem., 41, 509–14 (1935).

Ulich, Die Chemie., 55, 37–8 (1942).

Ulich, Oil and Kohle. 39, 523–7 (1943).